United States Patent
Chrobaczek et al.

(10) Patent No.: US 9,518,355 B2
(45) Date of Patent: Dec. 13, 2016

(54) PROCESSES AND COMPOSITIONS FOR DYEING OR FINISHING FIBROUS MATERIALS

(71) Applicant: Huntsman Textile Effects (Germany) GmbH, Langweid am Lech (DE)

(72) Inventors: Harald Chrobaczek, Augsburg (DE); Günther Tschida, Schwabmünchen (DE); Tanja Refle, Augsburg (DE); Ernst Jan Siewers, Alkmaar (NL)

(73) Assignee: HUNTSMAN TEXTILE EFFECTS (GERMANY) GMBH, The Woodlands, TX (US)

( * ) Notice: Subject to any disclaimer, the term of this patent is extended or adjusted under 35 U.S.C. 154(b) by 23 days.

(21) Appl. No.: 14/406,837

(22) PCT Filed: Jun. 28, 2013

(86) PCT No.: PCT/EP2013/001899
§ 371 (c)(1),
(2) Date: Dec. 10, 2014

(87) PCT Pub. No.: WO2014/005685
PCT Pub. Date: Jan. 9, 2014

(65) Prior Publication Data
US 2015/0159317 A1   Jun. 11, 2015

(30) Foreign Application Priority Data
Jul. 2, 2012   (EP) ..................................... 12174598

(51) Int. Cl.
| | | |
|---|---|---|
| *D06M 15/643* | (2006.01) | |
| *D06M 15/53* | (2006.01) | |
| *C08G 65/329* | (2006.01) | |
| *D06M 23/10* | (2006.01) | |
| *D06P 1/94* | (2006.01) | |
| *D06M 11/76* | (2006.01) | |
| *D06M 13/513* | (2006.01) | |
| *C08G 65/331* | (2006.01) | |
| *C08G 65/332* | (2006.01) | |
| *C08G 65/336* | (2006.01) | |
| *D06M 101/32* | (2006.01) | |

(52) U.S. Cl.
CPC ............ *D06M 15/53* (2013.01); *C08G 65/329* (2013.01); *C08G 65/331* (2013.01); *C08G 65/336* (2013.01); *C08G 65/3324* (2013.01); *D06M 11/76* (2013.01); *D06M 13/513* (2013.01); *D06M 15/643* (2013.01); *D06M 23/105* (2013.01); *D06P 1/94* (2013.01); *C08G 2650/50* (2013.01); *C08L 2203/12* (2013.01); *D06M 2101/32* (2013.01); *Y02P 20/544* (2015.11)

(58) Field of Classification Search
CPC .. D06M 23/105; D06M 13/513; D06M 15/53; D06M 15/643; D06P 1/94; C08G 65/331; C08G 65/336; C08G 2650/50; Y02P 20/544; C08L 2203/12
USPC .......................................... 8/115.51; 252/8.61
See application file for complete search history.

(56) References Cited

U.S. PATENT DOCUMENTS

| | | |
|---|---|---|
| 2,983,623 A | 5/1961 | Coates |
| 5,709,910 A | 1/1998 | Argyle et al. |
| 6,010,542 A | 1/2000 | DeYoung et al. |
| 2010/0155644 A1 | 6/2010 | Ou et al. |

FOREIGN PATENT DOCUMENTS

| | | |
|---|---|---|
| DE | 39 06 724 | 9/1990 |
| EP | 0814112 A2 * | 10/1997 |
| EP | 0 814 112 | 12/1997 |
| EP | 0 846 803 | 6/1998 |
| EP | 1 126 072 | 8/2001 |
| EP | 1 809 806 | 10/2006 |
| WO | 94/18264 | 8/1994 |
| WO | 03/054048 | 7/2003 |
| WO | 2004/009897 | 1/2004 |

OTHER PUBLICATIONS

STIC Search Report dated Mar. 30, 2016.*
Okubayashi, Satoko, et al.; "Supercritical Dyeing of Polyester Fibers in a Mini-Plant Possessing Internal Circulator"; Sen'i Gakkaishi; vol. 67 No. 2; pp. 27 - 33; 2011.

* cited by examiner

*Primary Examiner* — Eisa Elhilo
(74) *Attorney, Agent, or Firm* — Huntsman Textile Effects (Germany) GMBH

(57) ABSTRACT

Compositions comprising a specific ethoxylated/propoxylated product as well as an alkylene carbonate, an epoxysilane or a polysiloxane are useful for dyeing or finishing fibrous materials. Reaction products formed from said products are also very useful for these purposes. Said products are preferably used as solutions in supercritical carbon dioxide.

18 Claims, No Drawings

PROCESSES AND COMPOSITIONS FOR DYEING OR FINISHING FIBROUS MATERIALS

CROSS REFERENCE TO RELATED APPLICATIONS

This application is the National Phase of International Application PCT/EP2013/001899 filed Jun. 28, 2013 which designated the U.S. and which claims priority to European Pat. App. No. 12174598.8 filed Jul. 2, 2012. The noted applications are incorporated herein by reference.

FIELD OF INVENTION

This invention relates to compositions comprising products and/or product mixtures and/or reaction products. The present invention further relates to solutions of such compositions in supercritical carbon dioxide and processes wherein these solutions are used.

BACKGROUND OF THE INVENTION

It is known to dye or finish fibrous materials with compositions dissolved in supercritical carbon dioxide. This is apparent, for example, from "Supercritical Dyeing of Polyester Fibers in a mini-plant possessing internal circulator" in CA Abstract 155: 564784 c (relating to Sen'i Gakkaishi 2011, 67(2), pp. 27-33), and also from WO 94/18264 A1, EP 1 126 072 A2, DE 39 06 724 A1, EP 1 809 806 B1, WO 2004/009897 A1, and also EP 0 846 803 B1.

One disadvantage of existing processes for treating fibrous materials in supercritical carbon dioxide is that the dissolved products are frequently readily soluble in supercritical carbon dioxide, but not in water. This often narrows the choice of products to be additionally used in the solution because of their beneficial properties. For the reason mentioned, it is frequently also impossible in the existing processes to bestow a desired degree of hydrophilic properties on the fibrous materials.

The problem addressed by the present invention was that of avoiding the disadvantages of known compositions/processes and providing compositions, or solutions thereof in supercritical carbon dioxide, wherewith fibrous materials can be treated or dyed and endowed with hydrophilic properties which can be controlled within wide limits.

SUMMARY OF THE INVENTION

The problem was solved firstly by a process for dyeing or finishing fibrous materials which comprises applying to said fibrous materials a solution comprising a product of formula (Ia) and/or of formula (Ib), each dissolved in a liquid product in the supercritical state, and/or a product obtainable by reacting a product, or a mixture of products, of formula (Ia) and/or formula (Ib) with one or more products of formulae (II) or (III), and secondly by a composition comprising at least one product of formula (Ia) and/or formula (Ib), or a mixture of products of formula (Ia) and/or (Ib), and comprising a product selected from one or more products of formulae (II) to (IV) and α-amino-carboxylic acids, and also by a reaction product formed from a product or product mixture of formula (Ia) or (Ib) with one or more products of formulae (II) or (III),

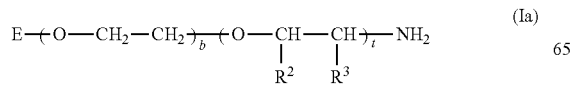
(Ia)

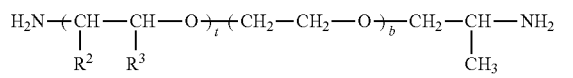
(Ib)

(II)

(III)

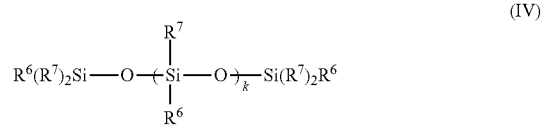
(IV)

wherein the resulting reaction products can be further converted into oligomers or reacted with silanes, wherein E represents hydrogen or $R^1$, $R^1$ represents alkyl of 1 to 13 carbon atoms, one of $R^2$ and $R^3$ represents —$CH_3$ while the other represents H, $R^4$ represents H, —$CH_3$, —$CH_2$—$CH_3$ or —$CH_2$—OH, $R^5$ in each occurrence independently represents $R^1$ or —OH or —$OR^1$, $R^6$ in either occurrence independently represents $R^5$ or $R^8$, $R^7$ in each occurrence independently represents $R^1$, $R^8$ in each occurrence independently represents a radical of formula (V) or of formula (VI),

(V)

(VI)

$R^9$ in each occurrence independently represents hydrogen or —$CH_3$, b represents 0 or 1 in the case of formula (Ia) and a number from 0 to 15 in the case of formula (Ib), t represents a number from 5 to 14 and the b:t ratio represents a number from 0 to 0.2 in formula (Ia) and from 0 to 1.1 in formula (Ib), k represents a number from 0 to 1000, and X and Y each independently represent a linear or branched alkylene radical of 1 to 4 carbon atoms and Z represents a linear or branched alkylene radical of 2 to 4 carbon atoms, and also by a composition comprising a product of formula (Ia) and/or formula (Ib), each dissolved in a liquid product in the supercritical state,

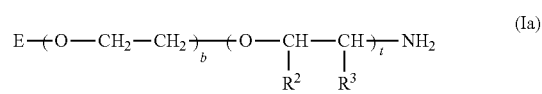
(Ia)

(Ib)

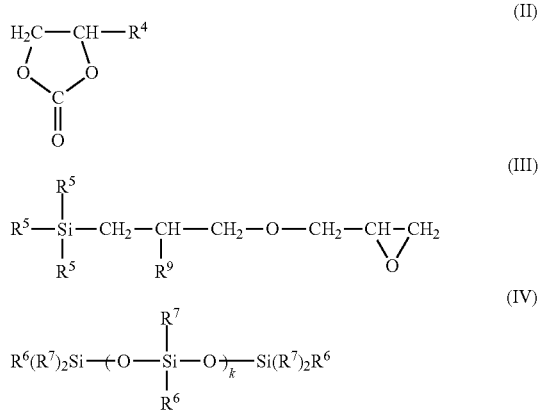

where
E represents hydrogen or $R^1$,
$R^1$ represents alkyl of 1 to 13 carbon atoms,
one of $R^2$ and $R^3$ represents —$CH_3$ while the other represents H,
$R^4$ represents H, —$CH_3$, —$CH_2$—$CH_3$ or —$CH_2$—OH,
$R^5$ in each occurrence independently represents $R^1$ or —OH or —$OR^1$,
$R^6$ in either occurrence independently represents $R^5$ or $R^8$,
$R^7$ in each occurrence independently represents $R^1$,
$R^8$ in each occurrence independently represents a radical of formula (V) or of formula (VI),
$R^9$ in each occurrence independently represents hydrogen or —$CH_3$,

b represents 0 or 1 in the case of formula (Ia) and a number from 0 to 15 in the case of formula (Ib),
t represents a number from 5 to 14 and the b:t ratio represents a number from 0 to 0.2 in formula (Ia) and from 0 to 1.1 in formula (Ib),
k represents a number from 0 to 1000, and
X and Y each independently represent a linear or branched alkylene radical of 1 to 4 carbon atoms and Z represents a linear or branched alkylene radical of 2 to 4 carbon atoms,
or a product obtainable by reacting a product, or a mixture of products, of formula (Ia) and/or formula (Ib) with one or more products of formulae (II) or (III), wherein the resulting reaction products may be further converted into oligomers or reacted with silanes.

Optionally, the solution which comprises a product of formula (Ia) and/or formula (Ib) may further comprise a product selected from one or more products of formulae (II) to (IV) and α-aminocarboxylic acids.

DETAILED DESCRIPTION OF THE INVENTION

Compositions of the present invention or reaction products of the present invention are preferably used in the form of solutions in a supercritical liquid, especially in supercritical carbon dioxide. Solutions in supercritical carbon dioxide of compositions or reaction products according to the present invention have particularly ecological as well as economic advantages over solution or emulsions in water. This is because, firstly, the removal of water after a dyeing/finishing process requires considerable amounts of energy; secondly, process water comprising by-products can cause wastewater issues. The term "supercritical liquid" in connection with the invention is to be understood as referring to a (fluid) medium where both the pressure and the temperature are above the critical point of this medium.

Furthermore, solutions according to the present invention comprise a product of formula (Ia) and/or formula (Ib) in a dissolved state in a supercritical liquid.

The compositions of the present invention comprise at least one product of the type defined above. Preferably, the product is soluble in water as well as in supercritical carbon dioxide at not less than 0.0001 mol per mole of water/supercritical carbon dioxide. This property means that the composition can be used to subject fibrous materials to a dyeing or finishing treatment wherein the fibrous material can be intentionally endowed with hydrophilic properties. Furthermore, in some cases, a composition comprising a product of formula (Ia) and/or (Ib) can serve as a store for $CO_2$. Preferably, the solubility in water and supercritical carbon dioxide is from 0.001 mol to 1 mol per mole of water/supercritical carbon dioxide. The particulars regarding solubility in water/supercritical carbon dioxide relate to atmospheric pressure and room temperature in the case of water and a pressure of 250 bar and a temperature of 120° C. in the case of supercritical carbon dioxide. Since compositions in accordance with the present invention can be mixtures comprising one or more products of formula (Ia) or (Ib) and additionally one or more products of formulae (II) to (IV) or α-amino acid, the abovementioned numerical particulars relate to the overall moles of these mixing partners.

The solubility of compositions and reaction products of the present invention is determined by following the method described hereinbelow.

Especially compositions comprising products of formula (Ia) or (Ib) or mixtures thereof in admixture with products of formulae (II) to (IV) or with α-aminocarboxylic acids, and the reaction products referred to are very useful for dyeing or finishing fibrous materials. L-Aspartic acid and L-glutamic acid are useful α-aminocarboxylic acids for example. These compositions and the reaction products of the present invention are preferably used in the form of solutions in supercritical carbon dioxide.

Compositions according to the present invention may in addition to the products mentioned above comprise further constituents, for example surface-active substances in the form of ethoxylates.

Preferably, E in formula (Ia) represents methyl or isotridecyl. Products very useful for dyeing or finishing fibrous materials further have t in formula (Ia) in the range from 8 to 10.

In very useful products for the stated purpose, in formula (III) one or more than one $R^5$ represents —$OR^1$.

Preferably, in products of formula (IV), $R^6$ as attached to a terminal silicon atom represents a radical of the formula which conforms to the definition of the radical $R^5$ in both occurrences.

Very useful solutions for dyeing or finishing fibrous materials comprise at least one product of the products or product mixtures mentioned in a liquid product in a supercritical state e.g. in supercritical ethane or propane. Supercritical carbon dioxide is the preferred solvent in a supercritical state. Therefore, only supercritical carbon dioxide is referred to hereinbelow even though other supercritical liquids also come into consideration. In these solutions, the concentration of said product or product mixture in supercritical carbon dioxide is preferably in the range from 0.0005% to 0.5% by weight.

The solutions in supercritical carbon dioxide may in addition to the compositions and reaction products of the present invention further comprise products suitable for textile dyeing or finishing or for the treatment of polymer materials. A person skilled in the art knows such additional products from the prior art. Useful additional products include, for example, acrylic esters or polydialkylsiloxanes, especially short-chain polydimethylsiloxanes. In these polydimethylsiloxanes, some of the methyl groups may be substituted by nitrogenous radicals, for example by radicals of formula (V) or (VI).

The solutions in supercritical carbon dioxide may further comprise capsules which encapsulate the products which are to be permanently attached to fabrics.

The solutions in supercritical carbon dioxide of compositions according to the present invention or of reaction products according to the present invention may possibly comprise products formed by reaction of these compositions or reaction products with carbon dioxide.

Compositions or reaction products of the present invention, especially their solutions in supercritical carbon dioxide, are very useful for treating/dyeing or finishing fibrous materials or for treating polymer materials, for example articles made of wood or articles made of plastic. Solutions in supercritical carbon dioxide which comprise products of formula (Ia) or (Ib) only are also very useful for the stated purposes. It will be appreciated that in the case of dyeings the solutions further comprise one or more dyes. Examples of suitable dyes for use in solutions in supercritical carbon dioxide are mentioned in the prior art cited at the beginning. Very useful further additions for finishing operations include, for example, the following products: permethrin and deltamethrin. The use of permethrin in the finishing of fabrics can be used to achieve an insect repellent effect, if desired. Compositions and reaction products of the present invention, especially their solutions in supercritical carbon dioxide, are also very useful for specific finishing operations, for example leveling operations, which are carried out on previously dyed fibrous material. For the stated purposes, the fibrous material can be introduced into the extractor part of the apparatus referred to hereinbelow, in which case a solution which is in accordance with the present invention is introduced into the extractor.

Fibrous materials which can be treated/dyed or finished with compositions or reaction products of the present invention or solutions of the present invention in supercritical carbon dioxide include wovens and knits composed of polypropylene fibers, carbon fibers, cotton or wool, polyester or polyamide fibers for industrial or apparel articles. Dyeing or finishing can be effected by following methods which are known to a person skilled in the pertinent art, as described for example in the prior art cited at the beginning.

Compositions of the present invention comprise either at least one product of abovementioned formula (Ia) or of formula (Ib) or a mixture of such products and also a product selected from one or more products of formulae (II) to (IV) and α-aminocarboxylic acids. Reaction products in accordance with the present invention are products formed by reaction of a product of formula (Ia) or (Ib) or mixtures thereof with one or more products of formulae (II) to (III). These reaction products may optionally be further converted into oligomers or further reacted with silanes.

The products of formulae (Ia) and (Ib) are commercially available and known from the prior art. Examples are products of the JEFFAMINE® range from Huntsman Corp., especially products of the JEFFAMINE® range of the M-series, the D-series and the ED-series. JEFFAMINE® M-600 polyetheramines are very useful for the compositions and reaction products and solutions of the present invention.

Products of formula (II), viz., alkylene carbonates, which are optionally substituted, are likewise commercially available products and so likewise form part of the prior art. Examples are products of the JEFFSOL® range from Huntsman Corp. Glycidoxypropylmethyldiethoxysilane or 3-glycidoxypropyltrimethoxysilane is very useful as product of formula (III) for compositions and reaction products of the present invention.

Products of formulae (III) and (IV) are known as prior art from silicone chemistry. Examples are 3-glycidoxypropyltrimethoxysilane and SILASTIC® 4-2737 from Dow Corning.

Examples of α-aminocarboxylic acids useful in admixture with products of formula (Ia) and/or (Ib) are L-aspartic acid and L-glutamic acid.

Compositions of the present invention comprise a mixture of a) one or more products falling within formula (Ia) or (Ib), and b) one or more products selected from products of formulae (II) to (IV) or α-aminocarboxylic acids. The mixing ratio here may be for example 50 to 90 parts by weight of product of formula (Ia) or (Ib) and 10 to 50 parts by weight of a compound of formula (II) to (IV).

Reaction products which are in accordance with the present invention are products obtainable by reacting the products mentioned above under a) with products mentioned under b).

This reaction can be effected by following generally/commonly known methods known from the prior art. It is believed that the reaction of a product of formula (Ia) or (Ib) with a product of formula (II) proceeds via an attack by an amino group on the carbon atom of the =C=O group and ring opening, which in the case of the compound of formula (Ia) yields a reaction product of the formula

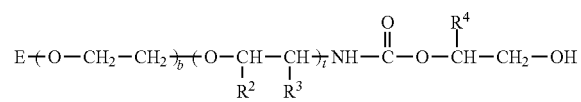

and/or of the formula

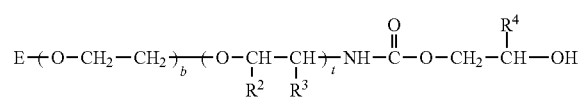

and in the case of the compound of formula (Ib) can yield a product of the formula

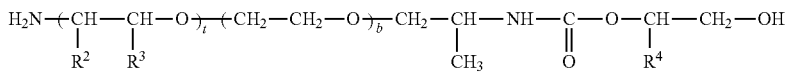

or an isomer thereof, which results from a different form of the ring opening, or yields a product whose formula differs from the last mentioned formula in that the still free —NH$_2$ group has also reacted with the cyclic carbonate with ring opening.

The reaction of products of formula (Ia) or (Ib) with products of formula (III) can proceed via ring-opening of the epoxy group or a substitution at the silicon atom, in which case the use of a compound of formula (III) can give rise to reaction products of the following formulae:

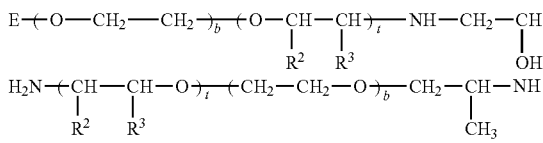 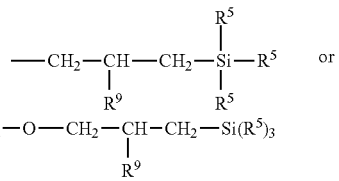 or or of a formula which differs from the lastmentioned formula in that its terminal NH$_2$ group has likewise reacted with the epoxysilane with ring opening of the epoxy group.

The reactions mentioned can be carried out in an inert solvent or, in specific cases, without using a solvent.

The reaction products thus formed can optionally be further converted into polymers or reacted with silanes.

Supercritical carbon dioxide, as will be known, is carbon dioxide at pressures and temperatures above the critical point.

The production and properties of supercritical carbon dioxide are described in the prior art, for example in the above-cited literature reference Sen'i Gakkaishi 2011, 67(2), pp. 27-33) and also in WO 94/18264 A1 and EP 1 126 072 A2.

Solutions in supercritical carbon dioxide which are in accordance with the present invention are preferably prepared by first preparing one or more compositions or reaction products according to the present invention and then dissolving these in supercritical carbon dioxide. In the case of mixtures according to the present invention, it is preferable to prepare the mixture first and then dissolve it in the carbon dioxide.

The solutions in supercritical carbon dioxide of compositions or reaction products of the present invention are obtainable using processes known from the prior art, for example by following methods described in Sen'i Gakkaishi 2011, Vol. 67, No. 2 (2011), pages 27 to 33, WO 94/18264, U.S. Pat. No. 5,709,910 and also in further documents mentioned in the introductory part of the description.

Suitable apparatuses and methods for producing solutions in supercritical carbon dioxide are also available from Dyecoo Textile Systems B.V., NL.

Apparatuses of this type contain an extractor. The solution of products in supercritical carbon dioxide can be prepared in the apparatus. The solution thus obtained is applied to the fibrous material in this extractor.

An apparatus of this type can also be used to determine the solubility of compositions and reaction products of the present invention in supercritical carbon dioxide. The apparatus further contains a separator. The product to be investigated is introduced into the extractor part of the apparatus referred to. Carbon dioxide is then fed into the extractor at a pressure of 250 bar and a temperature of 120° C. The product constituents which are soluble in supercritical carbon dioxide are transported forward into the separator. Their amount can then be determined analytically. The fractions which are insoluble in supercritical carbon dioxide remain behind in the extractor.

The use of solutions which are in accordance with the present invention for treating/dyeing or finishing fibrous materials can be effected by applying a solution of this type to the fibrous material. It can take place in accordance with processes described in EP 846 803 B1.

Solutions in supercritical carbon dioxide which are in accordance with the present invention can optionally bring about a scouring of the fibrous material, for example degreasing of wool articles or desiliconization of elastane fibers.

The examples which follow illustrate the invention.

EXAMPLE 1

Reacting a product of formula (Ia) with a product of formula (II):

88.2 g of JEFFAMINE® M-600 are initially charged at room temperature. 11.8 g of JEFFSOL® EC are added (JEFFSOL® EC is a product of formula (II) where R$^4$=H; JEFFAMINE® M-600 is a product of formula (Ia) where R$^1$=CH$_3$, b=1, R$^2$=H, R$^3$=CH$_3$ and t=9).

The mixture obtained is heated to 95° C. and maintained at 95° C. for 6 hours. This is followed by cooling down to room temperature to obtain a slightly yellowish, clear product which is soluble in supercritical carbon dioxide at 250 bar and 120° C.

EXAMPLE 2

Reacting a compound of formula (Ia) with a compound of formula (III):

69.7 g of JEFFAMINE® M-600 are initially charged at room temperature. 2.75 g of a catalyst (Accelerator 399 from Huntsman Corp.) based on piperazine are added. Under agitation the mixture is heated to 85° C. and then purged with N$_2$ and maintained under N$_2$. Under continued agitation, 27.55 g of 3-glycidoxypropyltrimethoxysilane are added dropwise at 85° C. in the course of 60 minutes. The mixture is stirred at 85° C. for a further 240 minutes and then cooled down to room temperature to obtain a slightly yellowish, clear liquid which is soluble in supercritical carbon dioxide.

EXAMPLE 3

Room temperature mixing was used to produce a composition comprising a product of formula (Ia) (the same product as in Example 1) and also a product of formula (IV). The latter was a liquid polydimethylsiloxane which contained substituents of the formula

—$CH_2$—$CH_2$—$CH_2$—NH—$CH_2$—$CH_2$—$NH_2$ in the side chain. This siloxane had a nitrogen content of about 7% by weight and a viscosity of about 100 mPa·s at 20° C.

The composition contained about 80% by weight of the product of formula (Ia) and about 20% by weight of the compound of formula (IV).

The composition obtained was soluble in supercritical carbon dioxide at a concentration of 0.37% by weight.

EXAMPLE 4

40.0 g of propylene carbonate (JEFFSOL® PC) are initially charged at room temperature.

60.0 g of amino-functional polydimethylsiloxane (3% by weight of N, aminoethylaminopropyl-functional side chain, $(CH_3)_3$Si-endblocked) are added and dissolved under agitation.

The result is a clear, light yellow liquid.

5 g of MARLIPAL® O13/30 (isotridecyl ethoxylate with 3 EO) are stirred into 33.0 g of this solution, again at room temperature, and dissolved to form a clear solution.

This composition is subsequently stirred into 62 g of JEFFAMINE® M-600 (monoamine). The result is again a clear, light yellow liquid.

EXAMPLE 5

The solubility of the product JEFFAMINE® ED-600 in supercritical carbon dioxide was investigated in this example. JEFFAMINE® ED-600 is a product which falls within formula (Ib) of the present invention.

The following results were obtained at a pressure of 250 bar and a temperature of 75° C. (differing from the above-mentioned temperature):

feed into the (above-described) extractor: 30.1 g
found in extractor after completion of test: 23.8 g
product quantity in separator: 6.1 g The product is less soluble in supercritical carbon dioxide than JEFFAMINE® M-600, which falls within formula (Ia).

EXAMPLE 6

Finishing Treatments

Polyester fabric dyed with Disperse Orange 25 had solutions of JEFFAMINE® M-600 in supercritical carbon dioxide applied to it. This was done at a temperature of 120° C. and a pressure of 250 mPa·sec during 60 minutes. The applied quantities of JEFFAMINE® M-600 were in several tests 7.5·$10^{-3}$ ml, 3·$10^{-3}$ ml and 5.2·$10^{-3}$ ml, each based on 1 g of fabric.

The fabrics obtained exhibited good absorbency for water (determined according to AATCC 79) and good migrating behavior of water (wicking test) in the vertical direction. The values obtained here were distinctly better than for unfinished comparative fabrics.

The table which follows shows the results of measurements.

TABLE

| Sample | Hydrophilicity (droplet test) | Wicking test |
|---|---|---|
| 0 (comparative fabric) | >60 | 2.0 |
| 1 (7.5 · $10^{-3}$ ml/g) | 1 | 6.0 |
| 2 (3 · $10^{-3}$ ml/g) | 4 | 5.5 |
| 3 (5.2 · $10^{-4}$ ml/g) | 1 | 6.0 |

The hydrophilicity test (droplet test) determines the time in seconds from the start of wetting to complete wetting.

The wicking test indicates up to which height a vertically mounted fabric is wetted by water (measured in cm).

What is claimed is:
1. A process for dyeing or finishing fibrous materials which comprises applying to the fibrous materials a solution comprising:
   i) a product of formula (Ia) and/or a product of formula (Ib),

$$E\text{---}(O\text{---}CH_2\text{---}CH_2)_b\text{---}(O\text{---}\underset{R^2}{\underset{|}{CH}}\text{---}\underset{R^3}{\underset{|}{CH}})_T\text{---}NH_2 \quad \text{(Ia)}$$

$$H_2N\text{---}(\underset{R^2}{\underset{|}{CH}}\text{---}\underset{R^3}{\underset{|}{CH}}\text{---}O)_T\text{---}(CH_2\text{---}CH_2\text{---}O)_b\text{---}CH_2\text{---}\underset{CH_3}{\underset{|}{CH}}\text{---}NH_2 \quad \text{(Ib)}$$

each dissolved in a liquid in the supercritical state, and optionally in admixture with a product selected from a product of formula (II), a product of formula (III), a product of formula (IV), an α-aminocarboxylic acid and a mixture thereof, $$\underset{O}{\underset{\diagdown}{H_2C}}\text{---}\underset{\diagup}{\underset{O}{CH}}\text{---}R^4 \quad \text{(II)}$$
$$\underset{\|}{C}$$
$$O$$

$$R^5\text{---}\underset{R^5}{\underset{|}{\underset{|}{Si}}}\text{---}CH_2\text{---}\underset{R^9}{\underset{|}{CH}}\text{---}CH_2\text{---}O\text{---}CH_2\text{---}\underset{O}{\underset{\diagdown\diagup}{CH\text{-}CH_2}} \quad \text{(III)}$$

$$R^6(R^7)_2Si\text{---}O\text{---}(\underset{R^6}{\underset{|}{\underset{|}{Si}}}\text{---}O)_k\text{---}Si(R^7)_2R^6 \quad \text{(IV)}$$

where
E represents hydrogen or $R^1$,
$R^1$ represents alkyl of 1 to 13 carbon atoms,
one of $R^2$ and $R^3$ represents —$CH_3$ while the other represents H,
$R^4$ represents H, —$CH_3$, —$CH_2$—$CH_3$ or —$CH_2$—OH, $R^5$ in each occurrence independently represents $R^1$ or —OH or —$OR^1$, $R^6$ in either occurrence independently represents $R^5$ or $R^8$, $R^7$ in each occurrence independently represents $R^1$, $R^8$ in each occurrence independently represents a radical of formula (V) or of formula (VI), $R^9$ in each occurrence independently represents hydrogen or —$CH_3$,

  (V)

  (VI)

b represents 0 or 1 in the case of formula (Ia) and a number from 0 to 15 in the case of formula (Ib), t represents a number from 5 to 14 and the b:t ratio represents a number from 0 to 0.2 in formula (Ia) and from 0 to 1.1 in formula (Ib), k represents a number from 0 to 1000, and X and Y each independently represent a linear or branched alkylene radical of 1 to 4 carbon atoms and Z represents a linear or branched alkylene radical of 2 to 4 carbon atoms; and/or ii) a product dissolved in a liquid in the supercritical state obtained by reacting one or more products of formulae (Ia) and/or (Ib) as defined above with one or more products of formulae (II) and/or (III) as defined above.

2. The process as claimed in claim 1 wherein the liquid in the supercritical state is supercritical carbon dioxide.

3. The process as claimed in claim 2 wherein the concentration of the product of i) dissolved in supercritical carbon dioxide and/or the product of ii) dissolved in supercritical carbon dioxide is in the range from 0.0005% to 0.5% by weight.

4. The process as claimed in claim 1 wherein said solution further comprises iii) an acrylic ester or a polydialkylsiloxane with or without substitution by OH or by $OR^1$ groups or by radicals having amino groups.

5. The process as claimed in claim 1 wherein the product of i) and/or the product of ii): is soluble in water at not less than 0.0001 mol per mole of water; and, is soluble in the liquid the supercritical state at not less than 0.0001 mol per mole of liquid in the supercritical state.

6. The process as claimed in claim 5 wherein the product of i) and/or the product of ii): has a solubility in water of 0.001 mol to 1 mol per mole of water; and, a solubility in the liquid in supercritical state of 0.001 mol to 1 mol per mole of liquid in the supercritical state.

7. The process as claimed in claim 1 wherein $R^1$ represents in formula (Ia) represents —$CH_3$ or isotridecyl and/or t represents a number from 8 to 10.

8. The process as claimed in claim 1 wherein one or more than one $R^5$ in formula (III) represents —$OR^1$.

9. The process as claimed in claim 1 wherein $R^6$ in formula (IV) as attached to a terminal silicon atom represents $R^1$ in each occurrence.

10. A composition comprising a) a product of formula (Ia) or formula (Ib) or a mixture thereof,

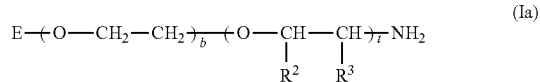  (Ia)

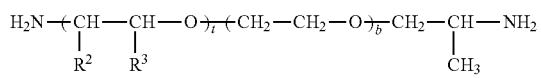  (Ib)

and b) a product selected from a product of formula (II), a product of formula (III), a product of formula (IV), an α-aminocarboxylic acid, and a mixture thereof,

  (II)

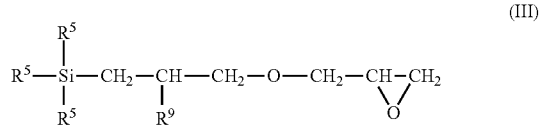  (III)

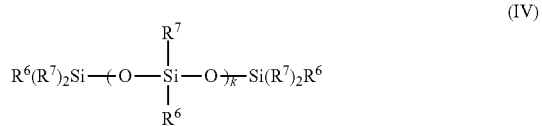  (IV)

where

E represents hydrogen or $R^1$, $R^1$ represents alkyl of 1 to 13 carbon atoms, one of $R^2$ and $R^3$ represents —$CH_3$ while the other represents H, $R^4$ represents H, —$CH_3$, —$CH_2$—$CH_3$ or —$CH_2$—OH, $R^5$ in each occurrence independently represents $R^1$ or —OH or —$OR^1$, $R^6$ in either occurrence independently represents $R^5$ or $R^8$, $R^7$ in each occurrence independently represents $R^1$, $R^8$ in each occurrence independently represents a radical of formula (V) or of formula (VI), $R^9$ in each occurrence independently represents hydrogen or —$CH_3$,

  (V)

  (VI)

b represents 0 or 1 in the case of formula (Ia) and a number from 0 to 15 in the case of formula (Ib), t represents a number from 5 to 14 and the b:t ratio represents a number from 0 to 0.2 in formula (Ia) and from 0 to 1.1 in formula (Ib), k represents a number from 0 to 1000, and X and Y each independently represent a linear or branched alkylene radical of 1 to 4 carbon atoms and Z represents a linear or branched alkylene radical of 2 to 4 carbon atoms.

11. A solution comprising the composition of claim 10 dissolved in supercritical carbon dioxide.

12. A reaction product obtained by reacting a product of formula (Ia) or formula (Ib) or a mixture thereof

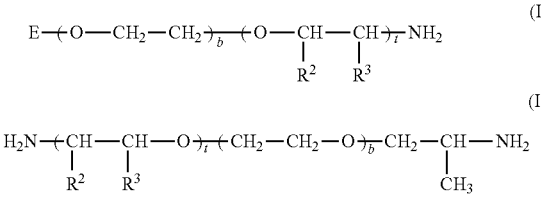
(Ia)

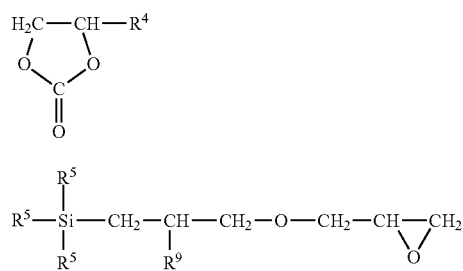
(Ib)

with at least one product of formula (II) or (III), $$\underset{\underset{O}{\overset{\|}{C}}}{\overset{H_2C-CH-R^4}{\underset{O}{\diagdown}\diagup}}$$ (II)

$$R^5-\underset{\underset{R^5}{|}}{\overset{\overset{R^5}{|}}{Si}}-CH_2-\underset{\underset{R^9}{|}}{CH}-CH_2-O-CH_2-\underset{\underset{O}{\diagdown\diagup}}{CH-CH_2}$$ (III)

where
E represents hydrogen or $R^1$,
$R^1$ represents alkyl of 1 to 13 carbon atoms,
one of $R^2$ and $R^3$ represents —$CH_3$ while the other represents H,
$R^4$ represents H, —$CH_3$, —$CH_2$—$CH_3$ or —$CH_2$—OH,
$R^5$ in each occurrence independently represents $R^1$ or —OH or —$OR^1$,
$R^9$ in each occurrence independently represents hydrogen or —$CH_3$,
b represents 0 or 1 in the case of formula (Ia) and a number from 0 to 15 in the case of formula (Ib),
t represents a number from 5 to 14 and the b:t ratio represents a number from 0 to 0.2 in formula (Ia) and from 0 to 1.1 in formula (Ib).

13. The reaction product as claimed in claim 12 wherein the reaction product is soluble in water and in supercritical carbon dioxide at not less than 0.0001 mol per mole of water/supercritical carbon dioxide.

14. The reaction product as claimed in 13 wherein the reaction product has a solubility in water of 0.001 mol to 1 mol per mole of water and a solubility in supercritical carbon dioxide of 0.001 mol to 1 mol per mole of supercritical carbon dioxide.

15. The reaction product as claimed in claim 12 wherein $R^1$ in formula (Ia) represents —$CH_3$ or isotridecyl and/or t represents a number from 8 to 10.

16. The reaction product as claimed in claim 12 wherein one or more than one $R^5$ in formula (III) represents —$OR^1$.

17. The reaction product as claimed in claim 12 wherein $R^6$ in formula (IV) as attached to a terminal silicon atom represents $R^1$ in each occurrence.

18. A solution comprising the reaction product of claim 12 dissolved in supercritical carbon dioxide.

* * * * *